Aug. 31, 1965    H. W. MIMNAUGH ETAL    3,203,532
RUBBER HOPPER FOR GRAIN LOADER
Filed July 3, 1963
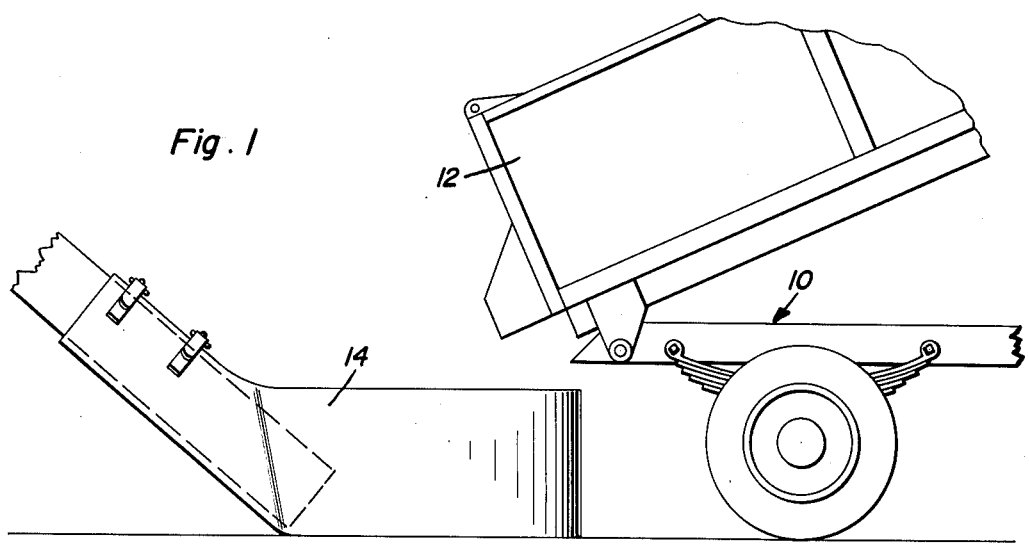
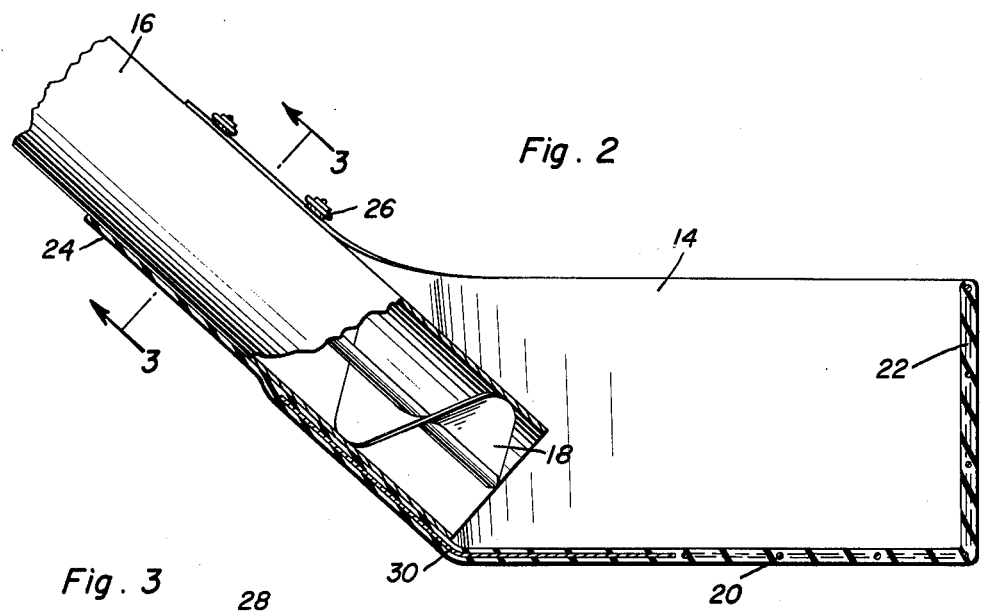
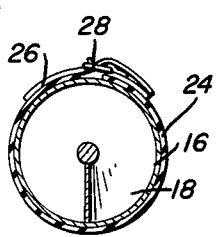
Henry W. Mimnaugh
Thomas Dragomir
INVENTORS
BY *[signatures]*
Attorneys

United States Patent Office 3,203,532
Patented Aug. 31, 1965

3,203,532
RUBBER HOPPER FOR GRAIN LOADER
Henry W. Mimnaugh and Thomas Dragomir, both of R.F.D 4, Alliance, Ohio
Filed July 3, 1963, Ser. No. 292,677
6 Claims. (Cl. 198—64)

This invention primarily relates to a hopper attachment for an auger whereby grain or other granulated material may be disposed in the hopper and transported by the auger to a suitable storage bin or the like.

It is the primary object of this invention to disclose a hopper for use with a grain or other granulated material auger which is flexible and reinforced so that moving objects coming in contact with the hopper will not crush or otherwise destroy the hopper structure.

A more specific object of this invention is to provide a device of the type indicated which is formed from rubber or other flexible material and is reinforced by a grid of resilient steel wire whereby the hopper upon being struck by a moving object such as a truck bed containing grain or other granulated material which is to be unloaded into the hopper, will spring back to its normal shape. Furthermore, by reinforcing the flexible rubber hopper, the hopper structure is specifically adapted for long lasting durable use.

A further object of this invention resides in the provision of means on the hopper for attaching the grain auger thereto and for preventing the auger from punching a hole through the bottom of the hopper.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation of a dump truck unloading grain or other granulated material into the hopper comprising the subject matter of the instant invention.

FIGURE 2 is an enlarged sectional view of the hopper structure taken through the longitudinal center thereof and further illustrating the grain or other granulated material auger attached thereto, parts of said auger being shown in section and part in side elevation for the purpose of clarity.

FIGURE 3 is a sectional view taken substantially along the plane indicated by the line 3—3 of FIGURE 2.

Referring now to the drawing in detail, the truck 10 having a pivotal bed 12 is adapted to load grain or other granulated material within the hopper 14. The grain or other granulated material is adapted to be conveyed through a tube 16 by means of an auger 18 disposed therein to a suitable storage area (not shown). It often happens that when the truck 10 is backed up adjacent the hopper 14, that the truck bed or the wheels of the truck will make contact with the hopper 14 thereby damaging or marring the hopper and possibly the auger. To prevent this from happening, the hopper 14 is formed of rubber or other flexible material whereby any contact of the truck with the hopper will not mar it and after the truck is removed, the hopper will spring back to normal shape and position.

The hopper 14 is molded out of rubber or other flexible material and reinforced with a plurality of vertical and horizontally disposed resilient steel wires such as shown at 20 and 22 running along the side walls and bottom of the hopper. These wires add rigidity to the hopper structure but also allow for the requisite spring return of the hopper.

The hopper 14 is formed with an open throat 24 adapted to receive the tube 16 and the auger 18. The tube 16 and auger 18 are held in place adjacent the bottom of the hopper 14 by means of a plurality of straps such as 26 mounted upon both sides of the throat 24 of the hopper 14. The straps 26 on both sides of the throat 24 are connected by means of a buckle 28 whereby the hopper throat is adapted to receive various sizes of auger tubes 16.

Also molded with the rubber or other flexible material hopper in the bottom thereof is a metal slab or plate 30. The slab 30 not only reinforces the hopper 14 but insures that the auger end does not wear or punch a hole through the rubber bottom of the hopper 14.

It will thus be seen that an inexpensive method has been utilized to solve a long standing problem in the art. That is, by making the loading hopper of a grain or other granulated material loading apparatus of reinforced rubber or other flexible material, substantial damage, destruction or wear during normal use of the hopper structure has been greatly eliminated. The hopper has also been provided with an adjustable throat for receiving an auger tube and the throat may be easily tightened around the auger tube to prevent any leakage of grain or other granulated material around the tube. The hopper is completely reinforced to withstand any abuse from within or without the structure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a grain auger and auger tube surrounding said auger, a flexible rubber hopper communicating with said tube and auger whereby grain disposed within said hopper may be conveyed to a storage area by said auger through said tube, said hopper including a split rubber throat receiving said auger and auger tube in tight encompassing relation for preventing leakage and clogging of grain disposed within said hopper.

2. The combination of claim 1 wherein said throat includes strap means for drawing said throat into tight clamping engagement with said auger and auger tube.

3. In combination with a grain auger and auger tube surrounding said auger, a flexible rubber hopper communicating with said tube and auger whereby grain disposed within said hopper may be conveyed to a storage area by said auger through said tube, said hopper including a plurality of reinforcing resilient steel wires embedded in the walls thereof.

4. The combination of claim 1 wherein said hopper further includes a metal slab embedded in a portion of the throat and bottom wall of the hopper for reinforcing said throat and bottom wall and underlying said auger and auger tube for preventing the auger and auger tube from wearing or punching a hole through the throat.

5. The combination of claim 4 wherein said throat includes strap means for drawing said throat into tight clamping engagement with said auger and auger tube.

6. The combination of claim 5 wherein said hopper still further includes a plurality of reinforcing resilient steel wires embedded in the walls thereof.

References Cited by the Examiner
UNITED STATES PATENTS
3,035,682   5/62   Ferch _____ 198—64
3,090,507   5/63   Gutekunst _____ 198—64 X SAMUEL F. COLEMAN, Primary Examiner.
EDWARD A. SROKA, Examiner.